United States Patent

Kaibach et al.

[11] Patent Number: 5,921,733
[45] Date of Patent: Jul. 13, 1999

[54] SELF-CUTTING UNDERCUTTING DOWEL

[75] Inventors: Werner Kaibach, Buchloe, Germany;
Hanspeter Schad, Grabs, Switzerland;
Stefan Raber, Kaufering, Germany;
Thomas Doppelbauer, Feldkirch, Austria

[73] Assignee: Hilti Aktiengesellschaft, Schaan, Liechtenstein

[21] Appl. No.: 08/991,241

[22] Filed: Dec. 16, 1997

[30] Foreign Application Priority Data

Dec. 16, 1996 [DE] Germany .......................... 196 52 280

[51] Int. Cl.[6] ...................................... F16B 13/06
[52] U.S. Cl. ................... 411/31; 411/57; 411/29
[58] Field of Search ................ 411/29, 30, 31, 411/55, 57, 60, 54

[56] References Cited

U.S. PATENT DOCUMENTS

| | | |
|---|---|---|
| 1,621,598 | 3/1927 | Phillips . |
| 2,707,897 | 5/1955 | Beeson . |
| 3,200,692 | 8/1965 | Catlin . |
| 3,202,035 | 8/1965 | Rosselet . |
| 4,050,345 | 9/1977 | Reibetanz .................. 411/31 |
| 4,702,654 | 10/1987 | Frischmann ............... 411/31 |
| 4,789,284 | 12/1988 | White ....................... 411/60 |
| 4,818,163 | 4/1989 | Bereiter .................... 411/54 |
| 4,898,505 | 2/1990 | Froehlich .................. 411/57 |
| 4,984,945 | 1/1991 | Bergner .................... 411/60 |
| 5,332,346 | 7/1994 | Shinjo ...................... 411/54 |

FOREIGN PATENT DOCUMENTS

| | | |
|---|---|---|
| 1388807 | 1/1965 | France . |
| 2103132 | 8/1972 | Germany . |

OTHER PUBLICATIONS

European Search Report, No. EP 97 810 943.7 dated Mar. 12, 1998.
English Language Abstract of German 2 103 132.
English Language Abstract of French 1,388,807.

*Primary Examiner*—Flemming Saether
*Attorney, Agent, or Firm*—Anderson, Kill & Olick, P.C.

[57] ABSTRACT

A self-cutting, undercutting dowel (1) is formed of an axially extending anchor rod (2) with a head part (3) leading in a setting direction (S) of the dowel and an axially extending sleeve (5) laterally enclosing the anchor rod (2). At its end facing in the setting direction, the sleeve (5) has expansion sections (7) separated from one another by axially extending slots (6). The sleeve (5) can be driven over the head part (3) relative to the anchor rod (2) so that the expansion sections (7) flare radially outwardly. At least one of the expansion sections (7) has a tooth shape at its end facing in the setting direction forming a cutting edge (10) for cutting an undercut in a receiving material for the dowel. The cutting action is effected by rotating the sleeve (5). The cutting edge (10) is located at a side edge (11) of the expansion section (7) leading in the rotating direction (R) of the sleeve (5) and the cutting edge is inclined to an axis (A) of the sleeve at a first angle ($\alpha$). The expansion section (7) with the cutting edge (10) has a trailing side edge (12) inclined relative to the axis (A) of the sleeve (5) at a second angle ($\beta$). The sum of the two angles ($\alpha, \beta$) is less than 160°.

15 Claims, 3 Drawing Sheets

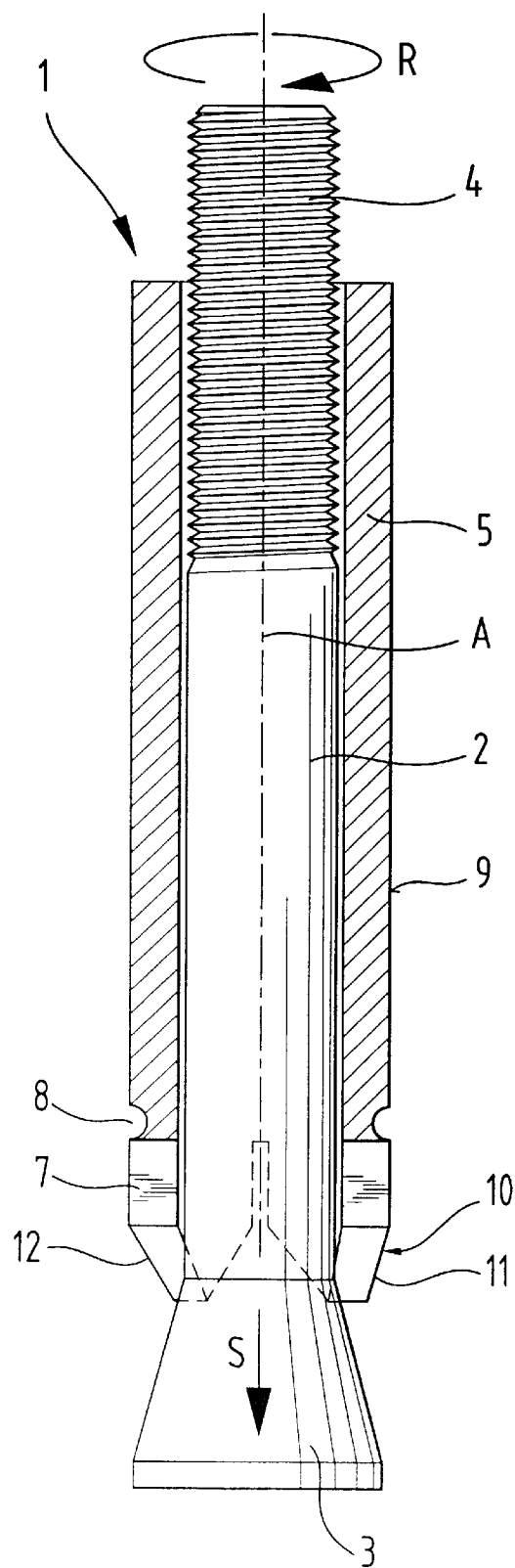
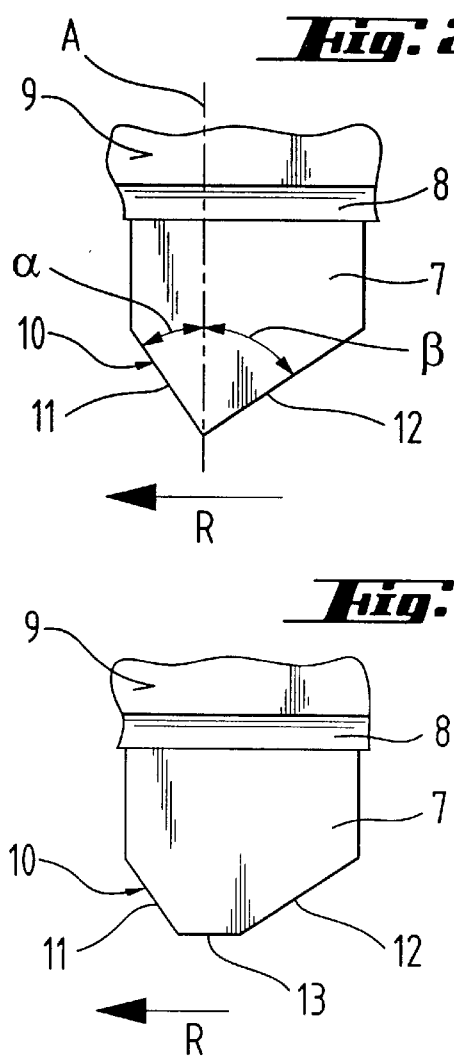
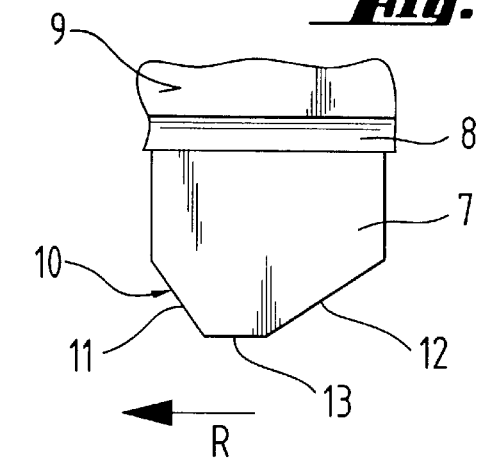
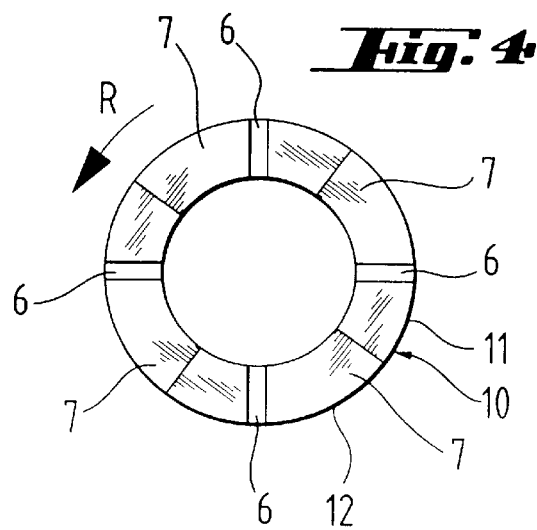

SELF-CUTTING UNDERCUTTING DOWEL

BACKGROUND OF THE INVENTION

The present invention is directed to a self-cutting, undercutting dowel formed of an anchor rod and a sleeve laterally enclosing the anchor rod. The anchor rod has a head part leading in the setting direction of the dowel and with an increasing diameter in the setting direction. The leading end of the sleeve is divided by slots into expansion sections. When the sleeve is driven over the head part, the expansion sections are flared radially outwardly. At least one of the expansion sections has a cutting edge for abrasively cutting the receiving material into which the dowel is inserted for forming an undercut.

In fastening techniques, frequently it is necessary to produce fastening elements largely free of expansion pressure. In particular, when edge and axial distances are small, there is the danger that cracking or chipping of the receiving material will take place in anchors or fastening elements using conventional expansion dowels. In such situations, anchoring systems are known in which a special fastening element is anchored positively in an accommodating borehole. The accommodating borehole is provided, at a defined depth, with an undercut. The fastening element inserted into the prepared accommodating borehole is formed of an anchor rod with a head part leading in the setting direction and which head part has an increasing diameter in the setting direction, and a sleeve forming a bore which is placed axially over the anchor rod. The leading end of the sleeve has sections which can be flared outwardly into the undercut by displacing the sleeve relative to the anchor rod.

In most cases, special equipment is needed to form the undercut and such equipment has an abrasive cutting edge which rotates eccentrically in the accommodating borehole so that the undercut is milled into the wall of the borehole. There are known undercutting dowels which automatically produce an undercut during the setting procedure. Such a self-cutting, undercutting dowel or anchor is described in U.S. Pat. No. 4,702,654 and includes a sleeve with expansion sections at its leading end in the setting direction extending from a plastic joint towards a conically shaped expanding head part at the leading end of the anchor rod. The expansion sections can be flared radially outwardly by displacing the sleeve over the head part, which is supported at the base of the borehole. The expansion sections are equipped with pin-shaped cutting edges inserted into the outer surface of the expansion sections. When the sleeve is rotated, the cutting edges, which overlap the circumference of the sleeve, form an undercut in the wall of the borehole at the same time that the expansion sections are flared radially outwardly. The setting procedure of the undercutting dowel is completed when the sleeve has traversed the necessary axially extending path and the expansion sections have been flared to the desired extent.

The setting of this known self-cutting, undercutting dowel is achieved with the help of a rotary percussion drill for driving the sleeve axially and rotating it relative to the expanding head part on the anchor rod. In such known undercutting dowels, the driving or percussion component of the drill is not used very effectively in forming the undercut. As a result, the cutting procedure is prolonged and it may happen that the expansion sections of the undercutting dowel are not fully expanded. In particular, contact with reinforcing bars can have an adverse effect on the formation of the undercut causing a negative effect on the desired holding values. Moreover, the cutting pins, inserted into the outer surface of the expansion sections, can become loose and fall out due to the high axial stress resulting from the axial impacts of the drill during the setting procedure.

SUMMARY OF THE INVENTION

Therefore, it is the primary object of the present invention to avoid the disadvantages in the prior art. Accordingly, a self-cutting, undercutting dowel is provided in which the impact percussion energy of the rotary percussion drill is utilized effectively for forming the undercut in a cylindrically shaped accommodating borehole. It is possible to set the undercutting dowel in a short time period in which the expansion sections of the dowel cut a sufficiently large undercut, even when there is contact with reinforcing bars.

In accordance with the present invention, a self-cutting, undercutting dowel is formed of an axially extending anchor rod with a head part at its first end leading in the setting direction, and an axially extending sleeve which laterally encloses or surrounds the anchor rod. The leading end of the sleeve, facing the head part, has expansion sections separated from one another by axially extending slots. When the sleeve is driven axially relative to the head part the expansion sections are flared radially outwardly. At least one of the expansion sections is toothed-shaped at its leading end and has a cutting edge which forms the undercut by abrasive action when the sleeve is rotated. The cutting edge is located at the side edge of the expansion section leading in the direction of rotation as the sleeve is rotated. The side edge forming the cutting edge is inclined at a first angle $\alpha$ to the axis of the sleeve. The expansion section with the cutting edge also has a trailing side edge inclined at a second angle $\beta$ to the axis of the sleeve, the sum of the two angles is less than 160°.

The self-cutting, undercutting dowel has a sleeve with expansion sections with at least one of the expansion sections having a cutting edge with its leading end having a toothed-like shape. The cutting edge is located at a side edge of the expansion section leading in the direction of rotation of the sleeve. The cutting edge is inclined relative to the axis of the sleeve and forms an effective cutting angle. A trailing side edge of the expansion section with the cutting edge is also inclined with respect to the axis of the sleeve and forms a clearance angle. The effective cutting angle and the clearance angle of the inventive configuration of the expansion section incorporating the cutting edge support the working or cutting procedure of the cutting edge and provide for an effective conversion of the percussion energy of the rotary percussion drill into an abrasive working of the receiving material in which the undercut is being formed. Since the percussion energy is introduced in an improved manner into the receiving material, the time required for forming the undercut is reduced. Even if there is contact with reinforcing bars, the undercut can be produced to an efficient extent and the required load carrying values of the dowel can be achieved. The inventive arrangement of the cutting edge at the leading end of the expansion section decreases the risk that the expansion section will be sheared off, since the forces acting on the cutting edge for producing the abrasive cutting of the receiving material, can be absorbed in an improved manner by the expansion section.

The first angle forming the effective cutting angle where the cutting edge is also inclined to the axis of the sleeve, is in the range of about 5° to 70° and preferably about 10° to 50°, and is smaller than the second angle forming the clearance angle where the trailing side edge is also inclined to the axis of the sleeve. Further, the second angle is larger than about 15° and preferably larger than 30°, but less than 90°. With such a relationship between the angles, the percussion energy is introduced in a particularly effective manner into the receiving material. The second angle, forming the clearance angle, additionally promotes the formation of the undercut, since the material removed can escape counter to the rotation direction of the sleeve and does not interfere with new removal of material.

In a preferred embodiment of the invention, the expansion section containing the cutting edge has a leading end extending transversely of the axial direction of the sleeve approximately perpendicular to the axis. This leading end is easily manufactured and offers the advantage that during inductive hardening of the cutting edge the contact surface can be optimized.

To improve the effectiveness of the cutting edge during the production of the undercut, the cutting edge and optionally the leading end edge have surfaces inclined inwardly from the outer surface of the expansion section at an angle of about 10° to 85°, and preferably in the range of about 30° to 85°. The inclined surfaces act like a chisel and support removal of larger pieces of the receiving material. As a result, the removal of the material can be improved even further.

In another embodiment of the invention, the cutting edge and optionally the leading end edge can have curved surfaces. While these curved surfaces can lead to a slightly reduced material removal, this feature is compensated by a decreased risk that the cutting edge will become wedged in the receiving material. The curved surface can prevent an interlocking of the cutting edge with the receiving material, particularly if there is contact with reinforcing bars.

In one embodiment of the inventive undercutting dowel, the cutting edge is a hard alloy insert, which is inserted into the leading side surface of the expansion section. The hard alloy inserts have the advantage that they can be produced in the desired hardness and adapted to the shape of the expansion section as carrier bodies. Since they can be produced separately from the sleeve of the undercutting dowel, the hard alloy inserts can be mass produced and stored until required.

A particularly simple manufacturing process for the cutting edge involves forming the cutting edge from the free end section of the expansion section. At the same time, at least the leading side edge of the expansion section is hardened. The i hardening can be carried out by induction hardening, laser hardening or by a different locally acting hardening procedure. In this connection, it is only necessary to assure that the plastic joint, connecting the expansion sections to the rest of the sleeve, does not become brittle.

It is advantageous if the material removing properties of the cutting edge are in the range of about 1.5 times to about 8 times and preferably 2 times to 6 times harder than the material of the sleeve.

Preferably, the inventive undercutting dowel has several cutting edges. Further, the number of cutting edges can be the same as or less than the number of expansion sections and can be as high as 10. A larger number of cutting edges increases the removal of material and accelerates the preparation of the undercut while reducing the time required for the setting procedure. The cutting edges may all be formed in the same way. Preferably, the cutting edges have first angles forming effective angles which differ from one another at least in some cases. As a result, the cutting edges can fulfill different functions. For an example, some of the cutting edges can be optimized for removal of material from the receiving material, while the remaining cutting edges can have a particularly good metal-removing cutting function upon contact with reinforcing bars. Preferably, such specialized cutting edges are disposed with an alternating sequence in the circumferential direction.

A particularly cost effective embodiment of the undercutting dowel involves stamping the sleeve and shaping it out of sheet metal. The sleeve can be stamped with the desired tooth shaped cutting edge shape from a suitable flat sheet of metal. Subsequently, the expansion sections and cutting edges can be provided with the final shape, for example, by cross rolling and embossing steps. Finally, the sheet metal part is rolled into a sleeve and installed on the anchor rod.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there are illustrated and described preferred embodiments of the invention.

BRIEF DESCRIPTION OF THE DRAWING

In the drawing:

FIG. 1 is an axially extending view, partially in section, of an undercutting dowel embodying the present invention;

FIG. 2 is a first embodiment of an expansion section provided with a cutting edge on an enlarged scale compared to FIG. 1;

FIG. 3 is a second embodiment of an expansion section provided with a cutting edge also on an enlarged scale as compared to FIG. 1;

FIG. 4 is a leading end view of the sleeve shown in FIG. 1 on an enlarged scale, but without the anchor rod;

DETAILED DESCRIPTION OF THE INVENTION

Figure 5:
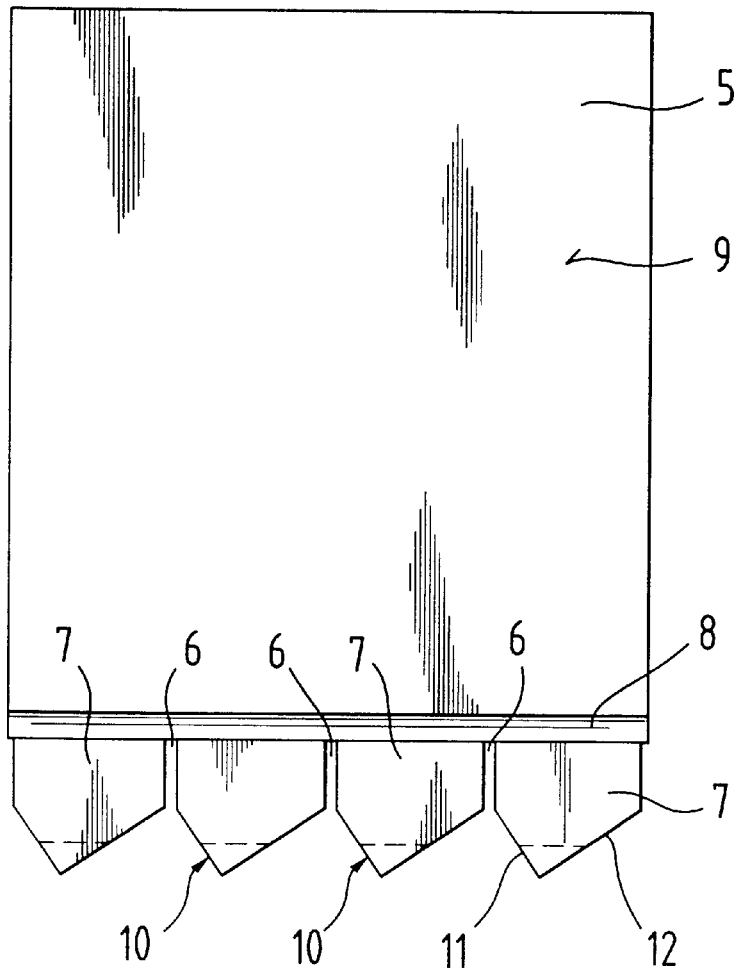
FIG. 5 shows the sleeve on a reduced scale as compared to FIG. 1 as a flat stamped sheet metal section prior to being rolled into a sleeve shape.

In FIG. 1 a self-cutting, undercutting dowel 1 is shown embodying the invention. The undercutting dowel 1 when inserted into a prepared borehole has a setting direction S. The undercutting dowel 1 includes an axially extending anchor rod 2 having a first end, the lower end in FIG. 1, and a second end, the upper end. At its first end, the anchor rod 2 has a head part 3 with its diameter increasing in the setting direction S. The head part 3 is shaped as a truncated cone. Instead of a conical surface, the head part 3 can also have a concavely curved outer surface, not shown. At the second end of the anchor rod, an external thread 4 is formed for applying a load. The undercutting dowel also includes an axially extending sleeve 5 laterally enclosing a major part of the anchor rod from the trailing end of the head part to the region of the external thread 4. The sleeve 5 has a first end leading in the setting direction and a second end. At the first end, the sleeve has a number of expansion sections 7 separated from one another by axially extending slots 6. The expansion sections 7 are separated from the remainder of the sleeve 5 by a circumferentially extending plastic joint 8. The plastic joint 8 is formed as a groove in the outer surface of the sleeve with the groove extending perpendicularly to the axis 8 of the sleeve. The plastic joint 8 encircles the outer surface 9 of the sleeve 5. The sleeve 5 can be driven over the outer surface of the head part 3 so that the expansion sections 7 expand radially outwardly due to the relative axial movement of the sleeve with respect to the anchor rod 2.

As can be noted in FIGS. 1 to 3, at least some of the expansion section 7 have a toothed shape at the first end of the sleeve 5. The toothed shaped expansion sections 7 have a cutting edge formed along a side edge of these sections, that is, the side edge leading in the direction of rotation R, note the upper end in FIG. 1. The leading side edge 11 is inclined relative to the axis A of the sleeve 5 by a first angle α, which is in a range of about 5° to 70° and preferably in the range of about 10° to 50°. The expansion section 7 also has a side edge 12 trailing in the direction of rotation R of the sleeve 5 and the side edge 12 forms a second angle β with the axis A of the sleeve, the second angle is larger than the first angle α formed by the leading side edge 11 and larger than about 15° and preferably larger than 30°, but less than 90°. The first and second angles α, β are selected so that their sum does not exceed 160°.

As illustrated in FIGS. 2 and 4, the leading and trailing side edges 11, 12 of an expansion section 7 having a cutting edge 10 can meet at a pointed edge at the first end of the expansion section 7, that is, the first end of the sleeve 5. In another embodiment shown in FIG. 3, the first end of an expansion section 7 forming the cutting edge 10 has a front edge 13 extending approximately perpendicularly to the axis A of the sleeve 5 and extending between and the leading side edge 11 and the trailing side edge 12 at the first end.

Figure 6:
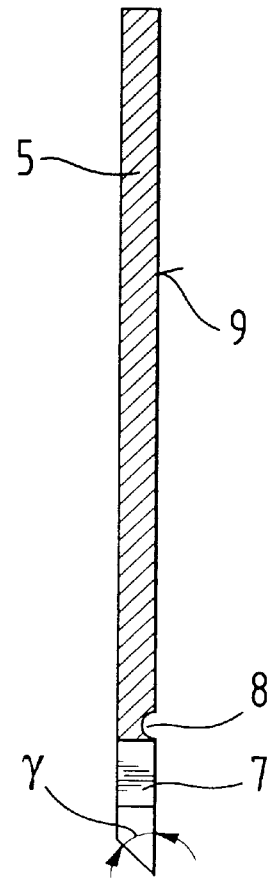
FIG. 6 is an axially extending sectional view of the stamped sheet metal part in FIG; 5.
Figure 7:
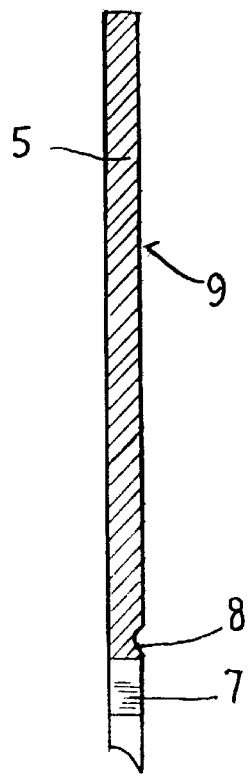
FIG. 7 is an axially extending sectional view of another embodiment of the stamped metal part shown in FIG. 6.

The expansion sections 7 with the cutting edges 11 and the plastic joint 8 can be formed by cutting or by a cold molding process. It is particularly advantageous if the sleeve 5 is formed from a stamped out sheet metal part, as is shown in FIGS. 5 and 6. FIG. 5 shows the sleeve in a flattened state. The toothed shape of the expansion sections 7, separated from one another by the axially extending slots 6 are shown clearly. In particular, the expansion section 7 forming the cutting edge 10, as shown in FIG. 2, is formed with leading and trailing side edges 11, 12 meeting along an edge forming a point. The plastic joint 8 is formed by a concave groove in the outer surface 9 of the sleeve 5 extending perpendicularly to the axis A of the sleeve. The groove 8 can be formed by embossing. As shown in FIG. 6, the cutting edge 10 is inclined inwardly and upwardly from the first end and forming an angle γ in the range of about 10° to 85° and preferably about 30° to 85° with outer surface of the sleeve 5. In an alternate embodiment, shown in FIG. 7, the inclined surface can be formed as a radius surface at the first end of the sleeve curving inwardly and upwardly from the outer surface to the inner surface of the sleeve.

Figure 8:
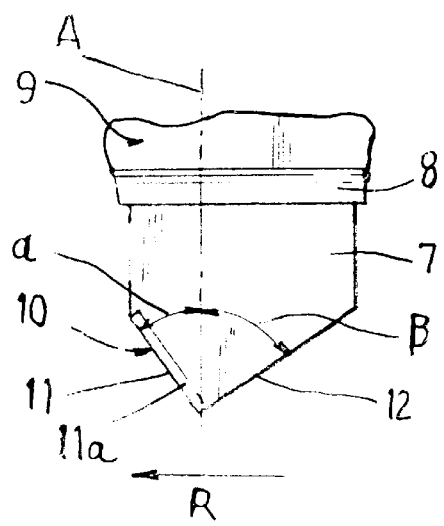
FIG. 8 is a view similar to FIG. 2 showing a hard alloy insert in the cutting side edge.

As displayed in FIG. 5, the cutting edges 10, 11 are located on all of the expansion section 7. Moreover, the cutting edges may be hard alloy inserts 11a embedded in the expansion sections 7 along the leading, generally axially extending edges 11, note FIG. 8. The cutting edges 10 can also be formed by the leading side edges of the expansion section 7 with at least the leading side edges 11 of the expansion sections being hardened. The leading side edges 11 are in the range of about 1.5 times to 8 times and preferably 2 to 6 times as hard as the material forming the sleeve. As indicated in FIG. 5, sleeve 5 can be formed with expansion sections 7 all having the cutting edges 10 shaped basically identically. As an alternative, however, at least some of the expansion sections 7 can be formed with cutting edges 11 inclined at different first angles a to the axis A of the sleeve 5. In one embodiment, the cutting edges 11 on the individual expansion sections 7 can be arranged to perform different tasks.

While specific embodiments of the invention have been shown and described in detail to illustrate the inventive principles, it will be understood that the invention may be embodied otherwise without departing from such principles.

We claim:

1. A self-cutting, undercutting dowel having a setting direction (S) for insertion into a borehole and comprising an axially extending anchor rod (2) having a first end and a second end with the first end leading in the setting direction (S), said anchor rod (2) having an axially extending integral head part (3) at the first end thereof, said head part (3) having an increasing diameter in the setting direction, an axially extending tubular sleeve (5) having an axis (A) and laterally encircling at least a substantially axially extending part of said anchor rod (2) and having a first end leading in the setting direction (S) and extending circumferentially about said axis (A) and a second end thereof trailing in the setting direction (S), the first end of said sleeve (5) having axially extending expansion sections (7) separated from one another by axially extending slots (6) and forming a relatively short axially extending part of said sleeve (5), said sleeve (5) arranged to be driven axially relative to said head part (3) for flaring said expansion sections (7) radially outwardly, at least one of said expansion sections (7) having a cutting edge (10) extending in the circumferential direction about said axis (A) for abrasively cutting an undercut in a receiving material containing the borehole by rotating said sleeve in a rotating direction (R), the first end of the at least one of said expansion sections (7) is toothed shaped with said cutting edge leading in the rotational direction (R) being formed by a circumferentially extending cutting side edge (11) inclined in the circumferential direction at a first angle (α) to the axis (A) of said sleeve (5), and said cutting edge (10) having a circumferentially extending trailing side edge (12) trailing in the rotational direction and inclined in the circumferential direction relative to the axis (A) of said sleeve at a second angle (β) with the sum of the first and second angles (α, β) in the circumferential direction being less than 160°.

2. An undercutting dowel, set forth in claim 1, wherein said first angle (α) of said cutting edge (10) is inclined in the range of about 5° to 70° and is smaller than the second angle (β) where the trailing side edge (12) is inclined relative to the axis (A) of the sleeve (5) with the second angle (β) being larger than 15° but smaller than 90°.

3. An undercutting dowel, as set forth in claim 1, wherein said first angle (α) is in the range of about 10° to 50° and said second angle (β) is larger than 30°.

4. An undercutting dowel, as set forth in claim 1 or 3, wherein said sleeve (5) is formed of a stamped-out flat sheet metal component rolled into a cylindrical form.

5. A self-cutting, undercutting dowel having a setting direction (S) for insertion into a borehole and comprising an axially extending anchor rod (2) having a first end and a second end with the first end leading in the setting direction (S), said anchor rod (2) having an axially extending integral head part (3) at the first end thereof, said head part (3) having an increasing diameter in the setting direction, an axially extending tubular sleeve (5) having an axis (A) and laterally encircling at least an axially extending part of said anchor rod (2) and having a first end leading in the setting direction (S) and extending circumferentially about said axis (A) and a second end trailing in the setting direction (S), the first end of said sleeve having axially extending expansion sections (7) separated from one another by axially extending slots (6), said sleeve (5) arranged to be driven axially relative to said head part (3) in the setting direction for flaring said expansion sections (7) radially outwardly, at least one of said expansion sections (7) having a cutting edge (10) facing in the setting direction and extending in the circumferential direction about said axis (A) for abrasively cutting an undercut in a receiving material containing the borehole by rotating said sleeve in a rotating direction (R), the first end of the at least one of said expansion sections (7) is toothed shaped with said cutting edge leading in the rotational direction (R) being formed by a circumferentially extending cutting side edge (11) inclined in the circumferential direction at a first angle ($\alpha$) to the axis (A) of said sleeve (5), the said cutting edge (10) having a circumferentially extending trailing edge side (12) trailing in the rotational direction and inclined in the circumferential direction relative to the axis (A) of said sleeve at a second angle ($\beta$) with the sum of the first and second angles ($\alpha$, $\beta$) in the circumferential direction being less than 160°, and said first angle ($\alpha$) of said cutting edge (10) is inclined in the range of about 5° to 70° and is smaller than the second angle ($\beta$) where the trailing side edge (12) is inclined relative to the axis (A) of the sleeve (5) with the second angle ($\beta$) being larger than 15° but smaller than 90°, and said sleeve (5) is formed of a stamped-out flat metal component rolled into a cylindrical form.

6. An undercutting dowel, as set forth in claim 1, 3 or 5, wherein said cutting edge (10) of said expansion section (7) has a circumferentially extending front side edge (13) at the first and thereof extending approximately perpendicularly to the axis (A) of the sleeve (5) and extending between and interconnecting said cutting side edge (11) and said trailing side edge (12).

7. An undercutting dowel, as set forth in claim 6, wherein said sleeve (5) has an axially extending outer surface and the at least one said expansion section having first end faces inclined radially inwardly at an angle ($\gamma$) in the range of about 10° to 85° with respect to the outer surface of said expansion sections (7) whereby said first end faces are inclined radially inwardly and upwardly.

8. An undercutting dowel, as set forth in claim 7, wherein said first end faces of said expansion section (7) are in the range of about 30° to 85°.

9. An undercutting dowel, as set forth in claim 6, wherein said sleeve including said expansion section having an outer surface and an inner surface, said first ends of the at least one said expansion section (10) being curved radially inwardly and upwardly from said outside surface to said inside surface.

10. An undercutting dowel, as set forth in claim 1, 3 or 5, wherein said cutting edge (10) comprises a hard alloy insert inserted into the cutting side edge (11) of said expansion section (7).

11. An undercutting dowel, as set forth in claim 1, 3 or 5, wherein said cutting edge (10) has a hardened cutting side edge (11).

12. An undercutting dowel, as set forth in claim 1, 3 or 5, wherein said cutting edge (10) is about 1.5 times to 8 times harder than a material forming said sleeve (5).

13. An undercutting dowel, as set forth in claim 12, wherein said cutting edge (10) is 3 times to 6 times harder than the material of said sleeve (5).

14. An undercutting dowel, as set forth in claim 1, 3 or 5, wherein at least some of said expansion sections (7) have cutting edges (10) and the number of said cutting edges being less than the number of said expansion sections (7) and having said first angle ($\alpha$) different from one another.

15. An undercutting dowel, as set forth in claim 1, 3 or 5, wherein each of said expansion section (7) having a cutting edge (10) and at least some of said expansion sections having said first angle ($\alpha$) different from said first angle of the remaining said expansion sections (7).

* * * * *